2,928,743

METHOD OF PREPARING A FLAKED CEREAL PRODUCT THICKENING WITH LIQUID

Reijer Rutgers, Alkmaar, Netherlands, assignor to N.V. Koninklijke Pellerij "Mercurius" v/h Gebroeders Laan, Wormerveer, Netherlands, a corporation of the Netherlands No Drawing. Application February 5, 1957
Serial No. 638,204

Claims priority, application Netherlands
February 13, 1956

4 Claims. (Cl. 99—80)

The object of the present invention is the preparation of flaked cereals that need not be cooked any longer, but which when mixed with a hot or cold liquid will produce a porridge. The porridge obtained is thickened. This distinguishes the product from the precooked breakfast cereals, such as cornflakes, puffed products, which do not thicken with liquid and which are to remain in particulate form. Furthermore the product naturally is distinguished from the quick cooking cereal grains which after a short cooking time are to produce a dry cooking, non-pasty granular mass.

The products known under the names of quick cooking rolled oats, rolled barley, flaked barley, flaked rice and the like, require a cooking time of e.g. from 1–6 minutes. The flaked product prepared according to the invention need not be cooked at all to give a thickened porridge. In the case of a quick cooking rolled cereal, cold milk or water is poured on the rolled cereal and the cereal is allowed to soak therein. A porridge will only form if a very large proportion of rolled cereal is used which, as such, however, does not thicken the liquid. The product obtained according to the invention produces a real thickening in lower concentrations.

The method according to the invention entirely differs from the processes for preparing a cooked and thickening cereal product from flour or middlings mixed with e.g. 100% of water by gelatinizing and drying the mixture on heated rollers.

According to the invention the method of preparing a flaked cereal product thickening with liquid is characterized in that cereal grains or parts thereof are cooked with water and steam under a superatmospheric pressure of from 0.3–4 ats. until they have a moisture content of from 60–20%, the product being subsequently dried and rolled and, if necesary, subjected to a further drying treatment.

A method is known in which a cereal after being moistened (up to a moisture content of 22–28%) is boiled or steamed at about 212° F., so not under pressure, and is subsequently flaked, which flakes are further boiled under atmospheric or subatmospheric pressure at 210–260° F. and are then dried till the moisture content is 3%. The present method differs from said known method in that the heating treatment is effected under pressure and at a temperature upwards of 100° C., while a subsequent further gelatinization of the flakes is not necessary.

According to another method cereal grains, especially oats, are baked to a brown colour in dry condition with superheated steam under a pressure of from 3–6 ats., the resulting product being rolled after moistening. The product requires boiling up or boiling water should be poured thereon. Other known methods comprise the heating of cereals with 50% of water under pressure and the pressing and drying of the resulting paste on a hot roller, or the cooking of moistened grains by crushing them between hot rollers having a temperature of from 600–700° F. (315–370° C.).

The cooking treatment under presure is conventional in the preparation of parboiled cereals, quick cooking cereals, puffed cereals and breakfast cereals and the object aimed at is always to obtain a dry cooking product that will not thicken with the liquid or become pasty. It was surprising that a flaked product thickening with liquid could be obtained according to a method in which a heating under pressure is applied.

It proved to be possible to obtain a product thickening with liquid by selecting the pressure, time and moisture content with a view to the magnitude of this thickening effect. In dependence of the pressure and the moisture content a rather short cooking time appeared to be sufficient. In the case of a longer cooking time or a higher pressure the thickening capacity of the cereal flakes or cereal flour obtained, however, need not necessarily further increase, but may also decrease. An advantage of a less intensive or a less long cooking treatment resides in the better keeping properties of the product obtained.

The manner in which the method according to the invention may be carried out is described hereinafter.

According to the invention cereal grains are cooked with added cold or hot water for a period ranging between 3 and 45 minutes under a super atmospheric pressure of from 0.3–4 ats. (with steam). After the cooking the moisture content ranges between 20 and 60%. Water and steam may be introduced into a vessel either simultaneously or otherwise, but it is also possible to moisten the grains separately and steam them in the pressure vessel. The method to be selected depends on the raw material, on the caking, the extent to which the product is to be cooked and the desired thickening capacity and the colour of the final product. After the cooking the granular mass is preferably dried until the moisture content ranges between 5–20%. For this drying treatment any apparatus of a suitable type may be used. It is also possible to apply an infrared and high frequency drying treatment; infrared drying may have a favourable influence on the properties of the final product especially in the first stages of the drying treatment. Between the cooking and drying, during the drying and after the drying, lumps, if any, in the granular mass may be loosened up by means of breakers. It is also possible to roll the product immediately after the cooking treatment or after a partial drying treatment and to subsequently dry the flakes until they have a moisture content at which the product can be kept. A flake is obtained then which has a different outward appearance, is stiffer and more transparent than when the rolling operation is effected after the drying treatment. It depends on the desired outward appearance of the product which method will be followed. Preferably the rolling operation is effected after the drying or the partial drying treatment, while, if necessary, a further drying of the flaked product is effected.

After being dried the grains are rolled to form flakes. It may be an advantage to steam the dried grains prior to the rolling treatment or to roll them in an other manner in a warm or hot condition. In this way the amount of fines and breakage in the flaked product may be reduced.

The flakes may be rolled to various degrees of thickness, e.g. to 0.1–0.6 mm. and preferably to 0.1–0.25 mm. The thickening capacity of the product increases as it is rolled into thinner flakes. According to the invention it is possible to make very thin flakes that have a reasonable degree of firmness in dry condition and in the porridge. After the rolling operation the flaked product may be comminuted or ground. This may also be done with the steamed grains, without rolling them.

The flakes obtained may be subjected to a further drying treatment until they have a moisture content at which their keeping properties are best. It is possible to subject the finished product to a toasting treatment in order to vary the colour and taste. This toasting treatment differs from the toasting to which breakfast cereals are conventionally subjected owing to the fact that the flake must retain its thickening capacities. The degree of toasting therefore must be relatively slight.

During the entire method tempering periods may be interposed at suitable points, so after the moistening treatment, the cooking process, after the drying and after the subsequent steaming treatment before flaking.

The optimum conditions for the preparation of the product vary in dependence of the type of cereal and the properties desired in the flakes. In the case of e.g. cut oat groats a pressure of ½–1½ ats., a cooking time of from 4–30 minutes and a moisture content of 27–38% after the cooking treatment are preferred, though also under different conditions a flaked oat product having thickening properties to a greater or less extent is obtained. In the case of higher moisture contents a product having reasonable thickening properties will be obtained at lower steam pressures.

The flaked product obtained if mixed with cold or hot liquid will produce a thickened porridge. It is not necessary to use a boiling liquid or to boil the mixture. As liquids may be used: water, milk and furthermore acid liquids, such as fruit juices, buttermilk and yoghurt.

In the course of the preparation it is possible to introduce all kinds of additives, which facilitate the preparation or which give the product desirable properties. Thus it is possible to add sugars or malt extracts, e.g. at the cooking, whereby the taste can be improved or the colour can be changed. The addition of a fat emulsion facilitates the preparation e.g. as regards the formation of lumps. Flavouring agents, e.g. salt, or vitamins may be added. The keeping properties of the product may be improved by the addition in some or other stage of natural or synthetic antioxidants. Minerals may be added, such as calcium salts, phosphor compounds, etc., whereby the nutritive value of the product is enhanced and whereby mostly also the consistency of the flakes is influenced to some extent. By adding e.g. 0.5% of disodiumphosphate a flaked product having improved thickening capacities is obtained. Some vitamin C, some organic or inorganic acid may be added to keep the colour lighter, said addition being preferably effected prior to the cooking.

The consistency and the coherence of the flakes may also be influenced by binding agents. Instead of moistening with water either undiluted, diluted or evaporated milk may be used.

The raw cereal material should be in the form of whole or broken grains, groats or fine grits. Particularly suited are cut oat- or barley grains, but also other cereals are usable. The cereal grains may be pre-treated as conventional in the industry. They may be dried and may be dehulled and pearled to a greater or less extent.

The invention will be illustrated with reference to the following examples:

Example 1

Cut oat groats are cooked with water for 15 minutes under a superatmospheric pressure of 1½ ats., the final moisture content amounting to 39%. After drying the groats until they have a moisture content of 16%, the product is rolled into flakes having a thickness of 0.40 mm.

Example 2

Uncut oat groats are cooked with water under a superatmospheric pressure of 2.0 ats. The product has a moisture content of 42% and is dried until the moisture content is 9%. The grains are subjected to a further steaming treatment for 15 minutes under atmospheric pressure and are rolled into flakes having a thickness of 0.35 mm.

Example 3

Cut oat groats having a moisture content of 9% are mixed with 25% of water and 0.5% of a fat emulsion and after a two hours' tempering they are cooked for 10 minutes under a superatmospheric pressure of 1 at. The product is dried and rolled into flakes having a thickness of 0.15 mm.

Example 4

Cut groats of barley are moistened with water until they have a moisture content of 25%, are steamed under a superatmospheric pressure of 1 at. for 20 minutes, dried and subjected to a further steaming treatment for 5 minutes and rolled into flakes having an average thickness of 0.25 mm.

Example 5

Cut pearled oat groats are mixed with hot water and 2% of malt extract until they have a misture content of 23% and are cooked for 40 minutes under a superatmospheric pressure of 0.5 ats. The product dried under infrared radiators until it has a moisture content of 17%, is subjected to a further drying treatment until the moisture content is 9% and after a further steaming treatment for 10 minutes the product is rolled into flakes having a thickness of 0.20 mm. The product is weakly toasted.

Example 6

Uncut oat groats are crushed. Subsequently water, 1.0% of a fat emulsion and 0.03% of vitamin C are added and after a two hours' tempering the mixture is heated for 20 minutes under a superatmospheric pressure of 1 at., the moisture content being 31% then. The product is dried and rolled.

Example 7

Pearled rice having a moisture content of 24% is cooked for 15 minutes under a superatmospheric pressure of 1½ ats. After the drying treatment the product is rolled into flakes having a thickness of 0.20 mm.

Example 8

Cut oat groats are mixed with water, 0.2% of salt, 1.0% of a fat emulsion and a small amount of an antioxidant. The mixture is cooked for 6 minutes under a superatmospheric pressure of 1.5 ats., whereupon the moisture content amounts to 34%. After a preliminary drying by means of infrared radiators the product is further dried until the moisture content is 13%, whereupon it is rolled into flakes having a thickness of 0.27 mm.

Example 9

Example 8 is repeated, but instead of water, milk is added.

Example 10

Cut oat groats are steamed with hot water for 3 minutes under a superatmospheric pressure of 0.3 ats., the moisture content of the grains amounting to about 60% after the steaming has been finished. The grains are separated from residual water if necessary, dried and rolled.

Example 11

Water and a slight amount of a fat emulsion are added to dehulled oats. After a 20 minutes' cooking under a superatmospheric pressure of 0.3 ats., the grains have a moisture content of 45%. After drying the grains are rolled into flakes having a thickness of 0.23 mm.

I claim:

1. A method of preparing from cut oat groats a flaked cereal product which thickens upon the addition of liquid thereto and becomes immediately suitable for consumption without cooking, which comprises the steps of cooking the groats with water and steam for 3 to 40 minutes at a pressure between 0.3 and 1.5 atmospheres gage until the groats have a moisture content of 20 to 60%, drying the resulting product, and rolling it into flakes.

2. A method of preparing from cut oat groats a flaked cereal product which thickens upon the addition of liquid thereto and becomes immediately suitable for consumption without cooking, which comprises the steps of cooking the groats for 4 to 30 minutes with water and steam at a pressure of 0.5 to 1.5 atmospheres gage until they have a moisture content of 27 to 38%, drying the resulting product and rolling it into flakes.

3. A method as defined in claim 1, wherein the product is further dried after rolling.

4. A method as defined in claim 1, wherein the product is rolled into the form of flakes having a thickness of 0.1 to 0.25 mm.

References Cited in the file of this patent

UNITED STATES PATENTS

| Re. 10,978 | Cormack | Jan. 1, 1889 |
| 332,073 | Gillman et al. | Dec. 8, 1885 |
| 598,137 | Cook | Feb. 1, 1898 |
| 693,485 | Ayres | Feb. 18, 1902 |
| 1,435,794 | Beck | Nov. 14, 1922 |
| 1,586,869 | Wesener | June 1, 1926 |
| 2,064,701 | Stokkebye | Dec. 15, 1936 |
| 2,332,914 | James et al. | Oct. 26, 1943 |
| 2,715,579 | Roberts | Aug. 16, 1955 |

FOREIGN PATENTS

| 9,528 | Great Britain | Oct. 11, 1906 |
| 379,944 | Great Britain | Sept. 8, 1932 |
| 719,870 | Great Britain | Dec. 8, 1954 |